(12) United States Patent
Regan et al.

(10) Patent No.: US 11,180,236 B1
(45) Date of Patent: Nov. 23, 2021

(54) CARBON PRESSURE VESSELS FOR GAS STORAGE

(71) Applicant: X Development LLC, Mountain View, CA (US)

(72) Inventors: William Raymond Regan, San Carlos, CA (US); Michael Jason Grundmann, San Jose, CA (US); Richard Wayne DeVaul, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 773 days.

(21) Appl. No.: 15/171,955

(22) Filed: Jun. 2, 2016

(51) Int. Cl.
| | |
|---|---|
| *B64B 1/40* | (2006.01) |
| *B64B 1/58* | (2006.01) |
| *B64B 1/06* | (2006.01) |

(52) U.S. Cl.
CPC .............. *B64B 1/58* (2013.01); *B64B 1/06* (2013.01); *B64B 1/40* (2013.01)

(58) Field of Classification Search
CPC .... B64B 1/58; B64B 1/06; B64B 1/40; B65D 25/14; B65D 65/42; C01B 32/00; C01B 3/0084; B29C 70/088; C23C 16/26; C23C 24/00; F17C 1/14; F17C 3/00; F17C 1/08; F17C 1/04; F17C 2203/0619; F17C 2203/0614; F17C 2203/0612; F17C 2203/0602; F17C 2203/06; F17C 2203/0636; F17C 2203/0634
See application file for complete search history.

(56) References Cited

U.S. PATENT DOCUMENTS

| | | | | |
|---|---|---|---|---|
| 3,172,774 | A * | 3/1965 | Diefendorf | ......... C04B 41/5001 427/249.6 |
| 3,715,253 | A * | 2/1973 | Olcott | ..................... C04B 35/83 156/175 |
| 3,945,589 | A * | 3/1976 | Crompton | ................. B64B 1/02 244/30 |
| 5,678,237 | A * | 10/1997 | Powell | .................... C03B 5/021 588/11 |
| 6,479,021 | B2 * | 11/2002 | Powell | .................... C03B 5/005 422/159 |
| 9,208,928 | B2 * | 12/2015 | Muramatsu | .......... H01B 13/321 |
| 2006/0030483 | A1* | 2/2006 | Jang | ................... B01J 20/28021 502/400 |
| 2007/0001053 | A1* | 1/2007 | Akhmeteli | ............... B64B 1/06 244/125 |

(Continued)

FOREIGN PATENT DOCUMENTS

| | | |
|---|---|---|
| JP | 2002515847 A | 5/2002 |
| JP | 2004244309 A | 9/2004 |
| JP | WO 2010137592 | 11/2012 |

OTHER PUBLICATIONS

The more accurate guide to the future, "could graphene foam be a future helium substitute", Jan. 2013, https://timeguide.wordpress.com/2013/01/05/could-graphene-foam-be-a-future-helium-substitute/, (Year: 2013).*

*Primary Examiner* — Medhat Badawi
*Assistant Examiner* — Vicente Rodriguez
(74) *Attorney, Agent, or Firm* — Fish & Richardson P.C.

(57) ABSTRACT

An apparatus comprising a spherical vessel, where the spherical vessel further includes a wall, where the wall is formed from one or more layers of material and a gas, where the gas may be lighter-than-air and is enclosed by the wall.

1 Claim, 6 Drawing Sheets

(56) References Cited

U.S. PATENT DOCUMENTS

| | | | |
|---|---|---|---|
| 2009/0114768 A1* | 5/2009 | Voorhees | B64B 1/38 |
| | | | 244/97 |
| 2010/0212727 A1* | 8/2010 | Lee | B01J 6/00 |
| | | | 136/252 |
| 2011/0070510 A1 | 3/2011 | McAlister | |
| 2012/0077020 A1 | 3/2012 | Muramatsu et al. | |
| 2016/0046795 A1* | 2/2016 | Bullock | B64B 1/40 |
| | | | 220/677 |
| 2016/0083068 A1 | 3/2016 | Crites | |

\* cited by examiner

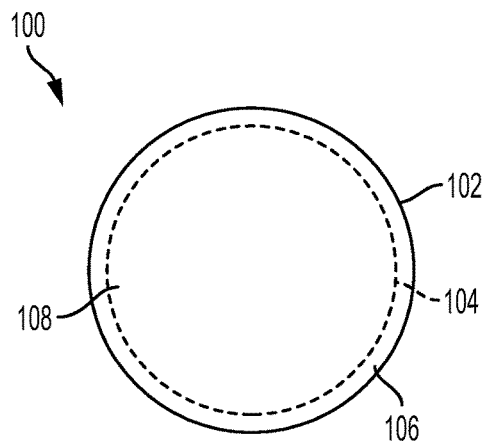
FIG. 1
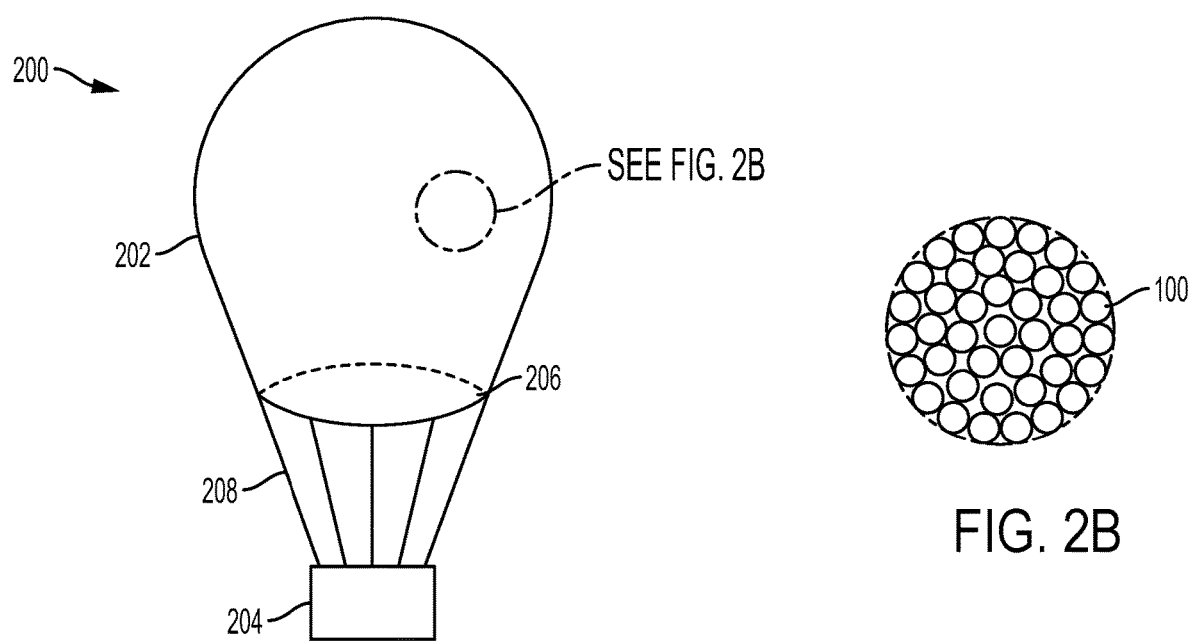
FIG. 2A
FIG. 2B

CARBON PRESSURE VESSELS FOR GAS STORAGE

BACKGROUND

Lighter-than-air aircrafts, such as hot air balloons or airships, generally generate lift by filling a balloon or cavity with gases, such as hydrogen, that are lighter than air. In some cases, aircrafts, such as a hot air balloon, may use an envelope coupled to a payload or platform. The envelope may be open on one end, preferably the bottom end, where lighter-than-air gas is provided into the envelope. This may be done by installing a burner at the bottom end of the envelope, or by providing lighter-than-air gas from a gas tank in the payload or platform.

In other cases, the aircraft may use a sealed vessel or cavity that may be filled with lighter-than-air gas, like an airship, for example.

In such cases, it may be possible that the envelope, the sealed vessel or cavity may not be properly sealed causing the lighter-than-air gas to leak and negatively impact the performance of the aircraft. Designing and manufacturing a sealed envelope or vessel may be expensive and may cause an increase in weight which is critical in an aircraft's performance.

Unless otherwise indicated herein, the materials described in this section are not prior art to the claims in this application are not admitted to be prior art by inclusion in this section.

SUMMARY

The present disclosure generally relates to systems and methods of manufacture of the system that incorporate a carbon pressure vessel that holds lighter-than-air or other gas mixtures in its cavity. The carbon pressure vessel may be a small sphere or may be shaped in any desirable shape using a mold. The carbon pressure vessel may be constructed from graphite. The carbon pressure vessel may be sealed such that gas stored inside the carbon pressure vessel's wall is impermeable. The carbon pressure vessel may also be designed and manufactured such that there are no holes or access points on the surface of the carbon pressure vessel. Such a configuration may prevent gas inside the cavity of the carbon pressure vessel from leaking out.

A large number of the small carbon pressure vessels may be collected inside an envelope to provide lift to an aircraft. The low-weight and high strength property (may even be negligible or almost zero relative to its gas contents) of graphite may allow using a large number of carbon pressure vessels without incurring any weight penalty. The small carbon pressure vessels may also be used to fill other types of vessels, such as inside the main hull of an airship.

Manufacturing the carbon pressure vessel may be done in a column filled with molten metals in a chamber that is filled with molten metals. The molten metal chamber may be heated up to a certain range of temperature to keep the metals in a liquid state. Methane gas or any other gas that consist of carbon and hydrogen molecules may be used. The gas enters the molten metal chamber from an aperture at the bottom of the chamber or another location in contact with the molten metal. As the gas rises up through the molten metal, and as it is heated, the carbon and hydrogen molecules may separate. Following separation, the carbon atoms may form a curved graphitic wall on the edge of the gas bubble, to create a spherical carbon pressure vessel. As the carbon pressure vessel is being formed, the hydrogen molecules that were split may remain in the bubble and be trapped inside the carbon pressure vessel. The carbon pressure vessel continues to rise up the molten metal chamber and cools, it may break the surface of the molten metal chamber and may be collected.

Another way of manufacturing the carbon pressure vessels may be to use a gas tank as a mold for the carbon pressure vessel. The gas tank may take the form of any shape or form that may suit a particular function. One particular gas tank may take the shape of an elongated cylindrical shape. Another gas tank may take the shape of a sphere or a shape that may resemble a sphere. The gas tank may not be completely sealed and may have an inlet or a cap such that various objects may be inserted into the gas tank. The gas tank may be filled with gaseous methane, solid polyethylene particles, or other hydrocarbons. Following the insertion of these hydrocarbons into the gas tank, the gas tank is heated by being inserted into an oven or other heating devices. As the gas tank is heated the hydrocarbons reach a critical temperature where they decompose and the carbon and hydrogen atoms separate. After the separation, the carbon atoms may crystallize into a graphitic coating on the walls of the gas tank—the carbon pressure vessel taking the form of the gas tank in a mold like fashion. The carbon pressure vessel will seal in the hydrogen molecules creating an air-tight sealed vessel. The original walls of the gas tank may be removed such that the outer walls of the carbon pressure vessel are exposed.

In another example, graphene or graphite patches may be manufactured by separating methane or other hydrocarbons into carbon and hydrogen. The patches may be manufactured by inserting methane gas through an aperture in a molten metal bath. As the methane gas rises up with the molten metal bath, the hydrocarbon is cracked and the carbon and hydrogen separate. As the bubbles of cracked gases rise through the molten metal bath, they may form curved graphitic carbon patches, either as an intact carbon pressure vessel filled with hydrogen or as an incomplete sphere that does not form a closed shell filled with hydrogen. The graphitic carbon patches rise through the molten metal bath and are collected on the surface of the bath. Intact graphitic carbon pressure vessels may be crushed to release the hydrogen or so that they can be reformed or repackaged for various purposes.

In one embodiment, an apparatus includes an enclosed vessel where the enclosed vessel includes a wall and an enclosed volume within the wall where the wall is formed by at least one wall formed from carbon materials, where the enclosed volume contains gas and where the enclosed vessel is constructed to substantially prevent unintended release of the gas.

In another embodiment, a sealed carbon vessel is manufactured by heating a molten metal in a chamber, injecting gas into the molten metal where the gas is injected from an aperture located from at least one of the chamber and an object inserted inside the chamber, where the aperture is in contact with the molten metal and where the gas comprises at least a hydrocarbon, separating carbon and hydrogen from the gas as the gas rises up in the molten metal, forming the sealed carbon vessel from the carbon separated from the gas and confining hydrogen inside the sealed carbon vessel, and collecting the sealed carbon vessel as the carbon vessel rises to the top of the molten metal.

In a further embodiment, a vessel comprises a metal outer wall where the outer wall has an opening, an inner wall adjacent to the metal outer wall where the inner wall is formed by at least one wall formed from carbon materials, and where the inner wall is a sealed pressure vessel and where the shape of the inner wall resembles that of the metal outer wall

BRIEF DESCRIPTION OF THE FIGURES

FIG. 1 depicts a carbon pressure vessel, according to an example embodiment.

FIGS. 2A and 2B show a balloon using carbon pressure vessels as a lift device, according to an example embodiment.

DETAILED DESCRIPTION

Figure 3A:
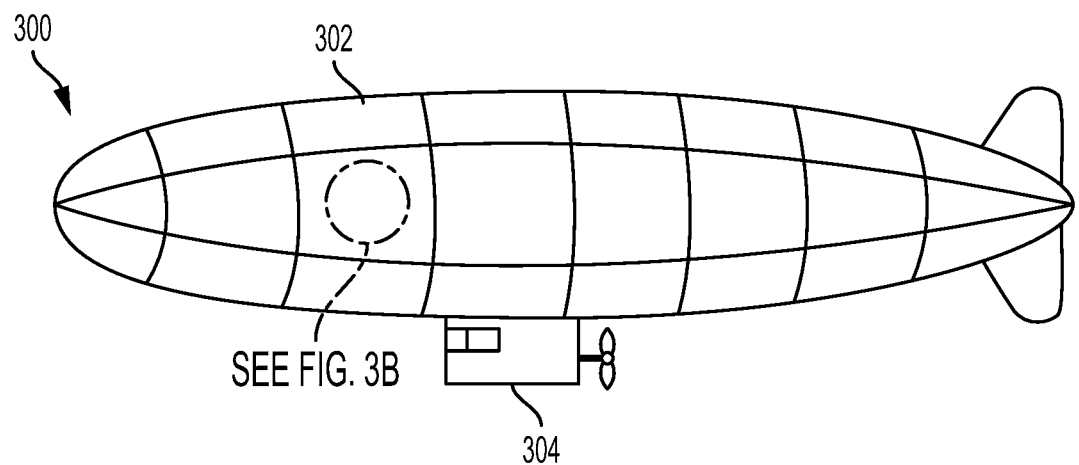
FIGS. 3A and 3B depict an aerial vehicle, using carbon pressure vessels as a lift device, according to an example embodiment.

Exemplary systems and methods are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed systems and methods can be arranged and combined in a wide variety of different configurations, all of which are contemplated herein.

Overview

Illustrative embodiments are related to a sealed carbon pressure vessel that contains a lighter-than-air gas in its cavity. In particular, illustrative embodiments may relate to systems of using the carbon pressure vessels in lighter-than-air travel applications and methods of manufacturing the carbon pressure vessels.

Lighter than air aircrafts use gases to generate lift. These gases fill an envelope or a vessel. For example, in a hot air balloon, gas may be contained in an envelope that may be attached to a payload or basket. In an airship, the gas may be contained inside a light sealed structure that may be covered by a fabric-like material. Generally, it may be hard to manufacture these envelopes and/or fabric-like materials in a way that they prevent the gas from leaking. This may cause a number of problems. First, due to the leaks, the lift generated by the gases may diminish over time. This may lead to installation of additional gas tanks to supplement the leaking gas which adds weight, and also to ongoing costs for replacement gases. Second, additional systems may need to be installed in order to properly monitor and react to the leaks also adding unnecessary weight.

Using a carbon pressure vessel may prevent gases from leaking out of the envelopes or fabric-like material. The carbon pressure vessels may be small spherical vessels that are lightweight and may be completely sealed, owing to the impermeability of graphene membranes to even very small gases. Carbon pressure vessels may be light enough that a large number of them may be placed inside a balloon envelope and not impact the lift characteristics of the aircraft. Owing to the negligible thickness of the wall of the carbon pressure vessel and the high tensile strength to mass ratio of graphene, the weight of the carbon pressure vessels inside a balloon envelope can be deemed negligible and essentially zero relative to the mass of the enclosed lift gases.

In one embodiment, the carbon pressure vessels may be manufactured by splitting a methane molecule in a molten metal bath. As the methane molecule enters the molten metal bath, methane may split into carbon and hydrogen. As carbon rises in the molten metal bath, it may form a hollow sphere while capturing the hydrogen molecules inside the sphere.

In another embodiment, the manufacturing process described above may be used to collect graphene or graphite patches that may be re-processed to manufacture different graphene products. The process may be similar to the description above, but would omit the hydrogen capturing process. Instead, only the graphene may be collected and used for a variety of purposes.

Illustrative Systems

A. Carbon Pressure Vessel

FIG. 1 depicts a carbon pressure vessel 100, according to an example embodiment. The carbon pressure vessel 100 may be spherical or may take a number of forms depending on the specific application. As shown in FIG. 1, the carbon pressure vessel 100 may have a wall 106 that has an outer surface 102 and an inner surface 104. The wall 106 may be composed of graphene or any other carbon based material. The carbon pressure vessel 100 may be a few nanometers to a few centimeters in diameter depending on application. The wall 106 may be composed of a few layers to hundreds of layers of sub-nanometer thick graphene layers that may result in a few nanometers to hundreds of nanometers thick wall. Due to the high strength to weight ratio of graphene, the mass of the carbon pressure vessel 100 may be negligible. The resulting carbon pressure vessel 100 may withstand up to 20 Gigapascals of net positive pressure. One reason for manufacturing the carbon pressure vessel 100 to the general specification described above, is that if the wall 106 becomes too thick, it may degrade the tensile strength of the graphite wall 106 due to the increased probability of large defects. Further, it is favorable to manufacture the carbon pressure vessel with multiple layers to compensate for small defects that may lead to gas 108 leaking through the wall 106.

In one embodiment, the wall 106 of the carbon pressure vessel 100 seals in its contents 108. Based on the properties of graphene, and depending on the radius of the carbon pressure vessel 100, the contents may be effectively permanently sealed. As the layers increase and with it the radius of the carbon pressure vessel increase, the lifetimes of the carbon pressure vessel (not leaking) tends to increase. As a general rule, the more layers and greater the size of the carbon pressure vessel, the more likely the contents will be sealed for a longer period of time.

In some embodiments, it may be possible to reversibly crumple and re-form the carbon pressure vessel if the internal vessel pressure is lower than the external pressure. Such a situation may arise in cases where the aircraft needs greater lift at higher altitudes. Reversible crumpling may be possible only in cases where the wall 106 of the carbon pressure vessel 100 is thin. As the wall 106 increases in thickness, graphene becomes more brittle causing the wall 106 to break and crack rather than retaining the ability to reversibly crumple.

FIGS. 2A and 2B depict a lighter-than-air aircraft, according to an example embodiment. Specifically, FIGS. 2A and 2B depict an air balloon 200. The air balloon 200 may have an envelope 202 that has an open bottom end 206. The envelope 202 may be attached to a payload 204 via a plurality of strings 208. The envelope 202 may be manufactured using flexible fabric or other flexible materials that can also contain certain pressures without tearing. The strings 208 may be made out of fabric or other flexible threads that can bear a significant amount of weight to support the payload 204 that may be attached to and supported by the envelope 202.

In one embodiment, the envelope 202 of the air balloon may contain a plurality of carbon pressure vessels 100. Generally, in a hot air balloon that uses heated lift gas for lift, a gas heater is located at the base of the envelope 202 to heat the air inside the envelope 202. However, as described above, the embodiment may include hundreds to trillions of the carbon pressure vessels 100 that are filled with hydrogen gas. The hydrogen gas inside the carbon pressure vessels 100 may provide sufficient lift to lift the air balloon 200 off the ground. Lift forces may be controlled by adding or removing the carbon pressure vessel 100.

In another embodiment, the envelope 202 and/or the payload 204 may have mechanisms that may collect excess carbon pressure vessels 100 and dispose of them in a manner such that the lift forces of the air balloon 200 can be controlled. In another embodiment, the carbon pressure vessels 100 may reversibly crumple and re-expand if the external pressure is decreased. This reverse crumple may be used to generate greater lift at higher altitudes where the density of air is low.

Figure 3B:
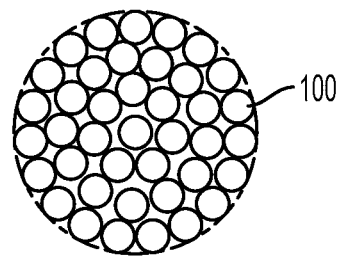

FIGS. 3A and 3B depict an airship 300 according to an example embodiment. Generally, airships 300 may be constructed using frames made from metallic materials. A flexible material 302 may cover these frames, sealing the interior of and forming the exterior of the airship 300. The passenger compartment and cockpit 304 are usually attached to the bottom of the airship 300, on the outer surface of the flexible material 302 that covers the frames of the airship 300. To provide lift, the interior of the airship 300 may generally be filled with lighter-than-air gases such as hydrogen or helium. In one embodiment, the airship may be filled using the carbon pressure vessels 100. Depending on the size of the carbon pressure vessel 100, hundreds to trillions of carbon pressure vessels may be used to fill the interior of the airship 300. In some embodiments, many carbon pressure vessels 100 may fill a plurality of sacks that are secured to the interior of the airship 300.

In some embodiments, the airship 300 may include mechanisms or systems that may be able to dispose of the carbon pressure vessels 100 to decrease the lift of the airship 300. In another embodiment, the airship 300 may include a system to manufacture the carbon pressure vessels 100 in cases where additional lift may be needed. In other embodiments, the airship 300 may include helium or hydrogen tanks or heating systems to heat up air inside the airship 300 to generate lift through means other than using the carbon pressure vessels 100.

In another embodiment, the carbon pressure vessels 100 may reversibly crumple and re-form if the external pressure is decreased. This reverse crumple may be used to generate greater lift at higher altitudes.

B. Chamber

Figure 4:
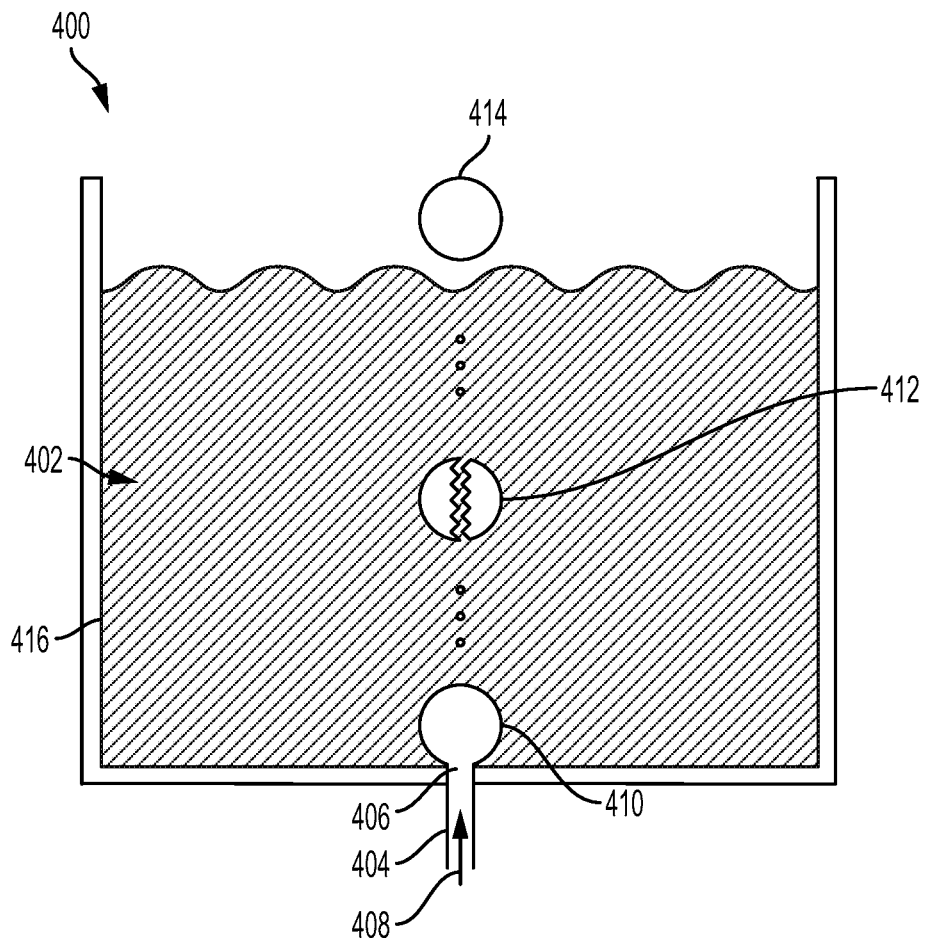
FIG. 4 depicts a method of manufacturing a carbon pressure vessel, according to an example embodiment.

FIG. 4 depicts a process of manufacturing a carbon pressure vessel, according to an example embodiment. In one embodiment, the carbon pressure vessel 414 is created in a growth chamber 400. The growth chamber consists of a chamber 416. The chamber may be made of refractory materials that have a high heat resistance, does not deform when heated, and/or does not melt and dissolve with the fluid inside the chamber 416 when heated. The chamber 416 may further be equipped with heating devices to heat contents that may be inside the chamber 416. The chamber 416 may include an aperture 406 on the bottom surface (or in another location in contact with the molten metal). The aperture 406 may be connected to a hose or pipe 404 that may transport gas 418 to the aperture 406. The aperture 406 may further include a valve system (not shown) that may control the amount and periods of gas 410 being inserted into the chamber 416 via the aperture 406. A control system (not shown) may be programmed to control the valve.

In another embodiment the aperture 406 may be located on the side surface of the chamber 416 as long as the location of the aperture 406 on the chamber is in contact with the molten metal. The aperture 406 may also be located inside the chamber 416. In one example, the aperture may be suspended inside the molten metal via a tube or a pipe. In another embodiment, the chamber 416 may include one or more apertures 406 inserting gas 406 simultaneously into the molten metal.

In another embodiment, the chamber 416 may be filled with molten metal 402. The molten metal 402 may be a combination of Tin (Sn), Aluminum (Al), Indium (In), Copper (Cu), Cobalt (Co), Nickel (Ni), and/or Iron (Fe). In some embodiments, the molten metal 402 may further include other metals for their various purposes. Metals with low carbon solubility properties may be preferred. For example, Cu has very low carbon solubility and may be used to selectively grow graphene monolayers. Ni has higher carbon solubility and can grow three to many layers. Fe has yet even higher carbon solubility than Ni and can grow relatively thick (in hundreds of nanometers) graphene films. The combination of metals chosen may be chosen to control the carbon solubility and melting temperature of the molten metal mixture 402. For example, metals like Al, Sn, and Cu may be used to lower the melting point of a metal mixture containing Ni. In one embodiment, the molten metal 402 may be heated to a temperature between 600-1500 degrees Celsius. The temperature of the molten metal 402 should be chosen to form high quality graphite.

In one embodiment, the gas 406 that is inserted into the molten metal 402 via the aperture 406 may contain carbon and hydrogen, such as methane ($CH_4$). As the methane molecule rises within the molten metal 402, and the methane molecule is heated, the carbon and hydrogen may separate. The carbon may graphitize into a spherical pressure vessel 412 while confining the hydrogen molecules. In another embodiment, the pressure vessel 412 may be formed into a shape other than a sphere. In some embodiments, the molten metal 402 may have low hydrogen solubility so that the hydrogen does not immediately diffuse into the molten metal after it is separated from the carbon and before the carbon forms into solid walls.

In another embodiment, the aperture 406 may be small enough such that the molten metal surface tension or continuous gas flow prevents the molten metal 402 from falling into and potentially clogging up the aperture 406. In some embodiments, the condition of the molten metal 402 may be such that the hydrogen molecules do not easily form hydrides at the temperature and pressure of the molten metal 402. In an embodiment, the carbon may not diffuse too far into the molten metal 402 from the hydrogen bubble before crystallizing into a solid wall.

In one embodiment, as the carbon pressure vessel 414 may rise to the top of the molten metal 402 and pop out or rise into a less dense metal with lower melting point and then pop out on top of the lower melting point metal. In another embodiment, the chamber 400 may be pressurized depending on the desired fill pressure of the carbon pressure vessel 414. In some embodiments, it may be possible to design the chamber 400 such that it is not too pressurized by controlling the temperature gradient versus the depth of the molten metal 402 such that the gas 410 can cool as it rises closer to the top surface of the molten metal 402. In such a scenario, the carbon pressure vessel 414 may rise and pop out of the coolest portion of the molten metal 402.

In one embodiment, the carbon pressure vessel 414 may be metal-phobic, such that as the carbon pressure vessel 414 pops out of the molten metal 402, very little metal sticks to the surface of the carbon pressure vessel 414. In another embodiment, the cooling process may be such so as not to break the surface of the carbon pressure vessel 414 as it cools. Graphene generally has a negative coefficient of thermal expansion at high temperature. Therefore, the carbon pressure vessel 414 may crack or get crushed by the molten metal 402 as it cools.

In another embodiment, the hydrogen gas may be supplied from a different aperture on the wall of the chamber 416. In such a configuration, the gas entered into the molten metal 402 may be any gas mixture that includes carbon and not necessarily methane. In one embodiment, carbon may be provided by dissolved graphite.

Figure 5:
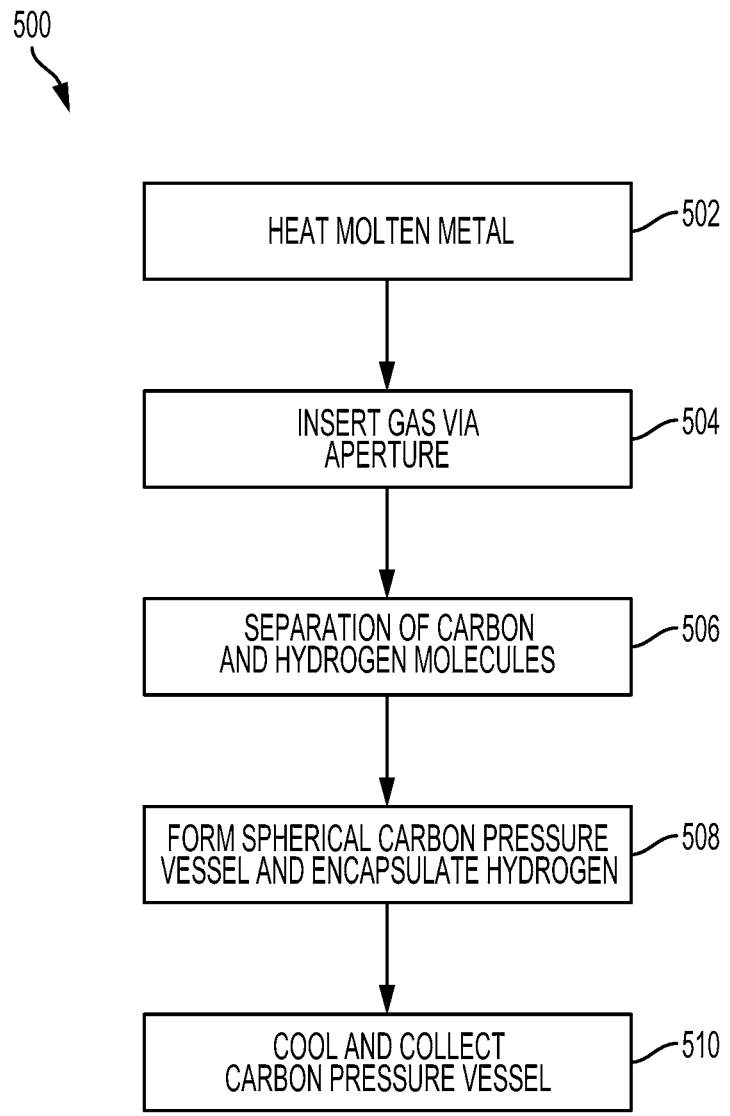
FIG. 5 depicts a flowchart of manufacturing a carbon pressure vessel, according to an example embodiment.

FIG. 5 is a flowchart of an exemplary method of growing a carbon pressure vessel 500. A growth chamber may include a chamber that contains molten metals. The molten metal is heated to a temperature between 600-1500 degrees Celsius and can be a mixture of a number of metals, such as Tin (Sn), Aluminum (Al), Indium (In), Copper (Cu), Cobalt (Co), Nickel (Ni), and/or Iron (Fe) 502. A gas containing carbon and hydrogen, such as methane, may be inserted via an aperture in the bottom of the chamber 504. As the methane rises in the molten metal the carbon and hydrogen may separate 506. Following separation, the carbon may form a spherical graphene pressure vessel and encapsulate the separated hydrogen molecules inside the pressure vessel 508. As the carbon pressure vessel rises in the molten metal, it may be cooled and pop out of the molten metal to be collected 510.

In one embodiment, the chamber may be pressurized to ensure that the carbon pressure vessels will not burst when its gaseous contents are hot. In another embodiment, the molten metal may be arranged with progressive lower densities and melting points. With such an arrangement, it may be possible to have an interface with another metal at lower temperature to cool the carbon pressure vessel before it pops out, in cases where the carbon pressure vessel cannot be directly extracted from the region of molten metal in which it was grown.

Figure 6:
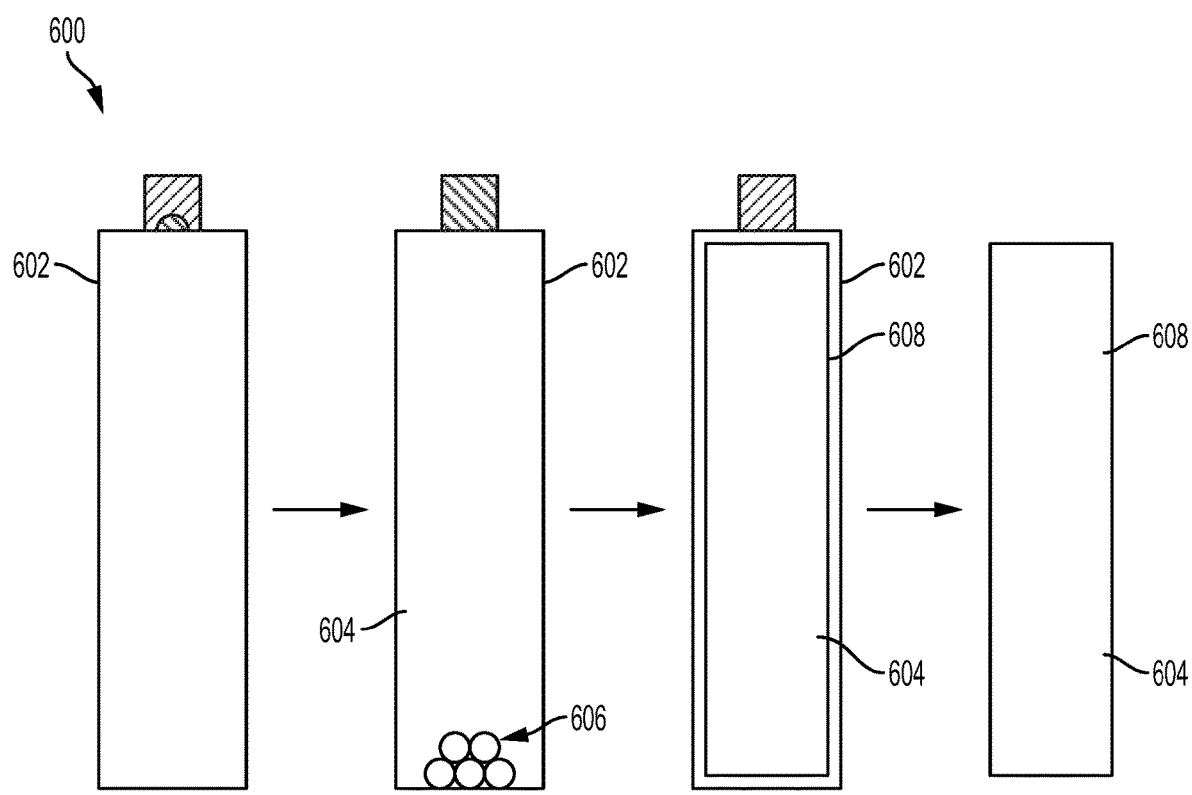
FIG. 6 depicts a method of manufacturing a carbon pressure vessel in a steel gas tank, according to an example embodiment.

In another embodiment, the chamber may be configured such that gravity or centrifugation is used to provide force for motion of the gas and carbon pressure vessel. In one embodiment, an existing steel gas tank may be used to grow a carbon pressure vessel to be used as a high energy density gas storage, for example. FIG. 6 illustrates a process of creating such a gas storage 600. A carbon pressure vessel 608 may be grown inside the steel gas tank 602 to form a double walled tank. This arrangement may increase strength of the steel gas tank 602 and in some instances decrease weight. Weight decrease may be achieved by removing or thinning the outer steel layer 602 after the carbon pressure vessel 608 has been formed. Hydrocarbons 606, such as polyethylene or polystyrene, and any other fill gas 604, such as nitrogen, may be added into the steel gas tank 602. The steel gas tank 602 may be heated to a temperature exceeding 600 degrees Celsius. The high temperature may be sufficient enough to separate the carbon and hydrogen of the hydrocarbons 606. The separated carbon may form a graphitic wall 608 inside the steel gas tank 602 forming a carbon pressure vessel 608 in the shape of the steel gas tank 602. In one embodiment, after the carbon pressure vessel is formed, parts of or all of the steel gas tank 602 may be removed to reduce weight. In another embodiment, the carbon molecules may form a graphite wall 608 adjacent to the inside wall of the steel tank 602 forming a carbon pressure vessel 608.

Figure 7:
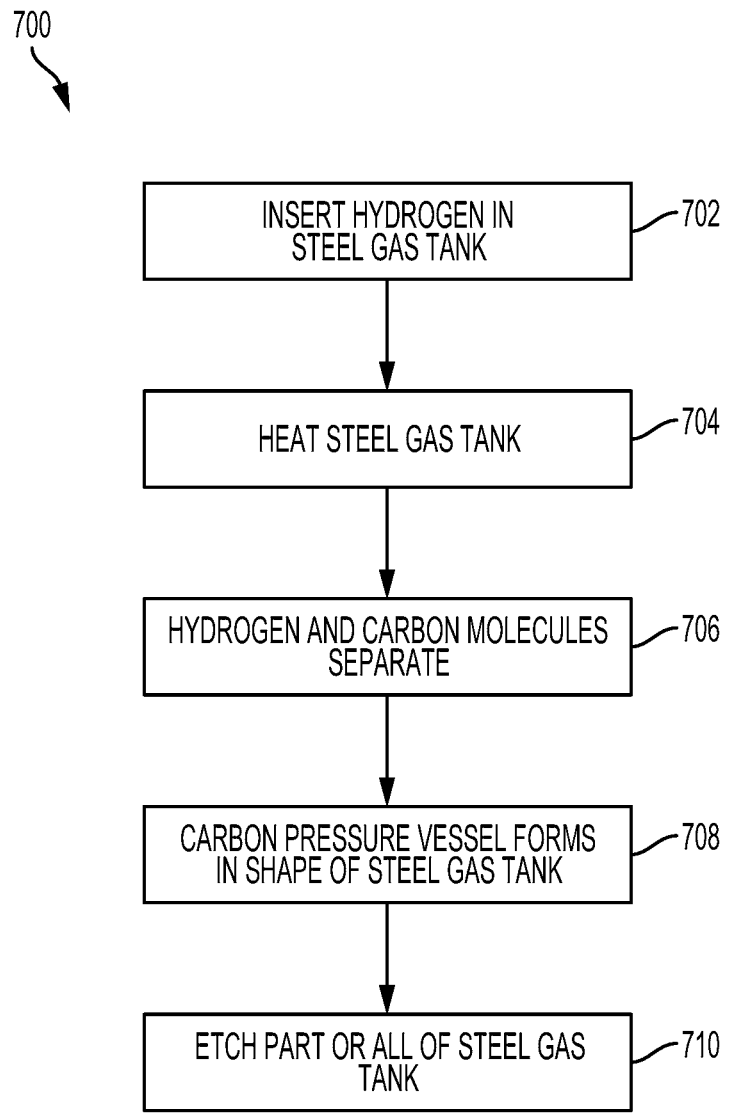
FIG. 7 depicts a flowchart of manufacturing a carbon pressure vessel in a steel gas tank, according to an example embodiment.

FIG. 7 is a flowchart of an exemplary method of growing a carbon pressure vessel inside a steel tank 700. Hydrocarbons may be inserted into the steel tank 702. Hydrocarbons may include polyethylene or polystyrene or any other that are composed of carbon and hydrogen. The steel tank may also be filled with a fill gas, such as nitrogen. The fill gas may also be any other gas that may be lighter than air and could be used to provide lift when used in an aircraft. The steel tank may be heated to a high temperature above 600 degrees Celsius 704. As the hydrocarbon inside the steel tank is heated, the carbon and hydrogen molecules may separate 706. The carbon may form a graphite wall adjacent to the inside wall of the steel tank forming a carbon pressure vessel 708. In some embodiments, the wall of the steel tank may be partially or completely etched to decrease weight of the tank 710. In another embodiment, the double walled tank (steel tank and graphite wall) increases the strength of the tank.

In one embodiment, a carbon pressure vessel may be grown, filled with hydrogen inside, but purposefully crushed to release the hydrogen gas. This process may also be used to create graphite patches that may be used to manufacture other products that use graphite as its main material.

In another example, graphene patches may be manufactured by separating methane into carbon and hydrogen molecules. The patches may be manufactured by inserting methane gas through an aperture in a molten metal bath. As the methane gas rises up with the molten metal bath, carbon and hydrogen molecules separate. As the carbon molecules rise through the molten metal bath, it may form curved graphitic patches but not a sealed carbon pressure vessel. Here, hydrogen will not be sealed within a carbon shell. As the carbon rises out of the molten metal bath it is collected. The collected carbon may be crushed so that it can be reformed or repackaged for various purposes.

CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:
1. A vessel comprising:
a metal outer wall; and
an inner graphitic wall formed on an interior surface of the metal outer wall to yield a double-walled tank, wherein the inner graphitic wall is composed of graphene and defines a sealed volume inside the metal outer wall.

* * * * *